(12) United States Patent
Wang et al.

(10) Patent No.: US 11,828,860 B2
(45) Date of Patent: Nov. 28, 2023

(54) LOW-SAMPLING RATE GPS TRAJECTORY LEARNING

(71) Applicant: International Business Machines Corporation, Armonk, NY (US)

(72) Inventors: Yong Wang, Xi'an (CN); Ge Liang, Xian (CN); Zhi Peng Jia, Xian (CN); Zhi Cao, Xi'an (CN); De Shuo Kong, Beijing (CN); Ye Wang, Xian (CN)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 17/458,632

(22) Filed: Aug. 27, 2021

(65) Prior Publication Data
US 2023/0060793 A1 Mar. 2, 2023

(51) Int. Cl.
*G01S 19/39* (2010.01)

(52) U.S. Cl.
CPC .......... *G01S 19/393* (2019.08); *G01S 19/396* (2019.08)

(58) Field of Classification Search
CPC .............................. G01S 19/393; G01S 19/396
USPC ................ 701/119; 342/352, 357.34, 357.42
See application file for complete search history.

(56) References Cited

U.S. PATENT DOCUMENTS

| 9,165,477 B2* | 10/2015 | Wilson | G01C 21/3697 |
| 2014/0005916 A1* | 1/2014 | Shen | G08G 1/0129 |
| | | | 701/119 |

FOREIGN PATENT DOCUMENTS

| CN | 104573116 B | 11/2017 |
| CN | 111311910 B | 12/2020 |
| JP | 2012098185 A | 5/2012 |
| JP | 6107106 B2 | 6/2013 |
| WO | 2018122803 A1 | 7/2018 |

* cited by examiner

*Primary Examiner* — Bo Fan
(74) *Attorney, Agent, or Firm* — Randy Tejeda

(57) ABSTRACT

One or more computer processors encode a plurality of time sequenced global position system (GPS) datapoints onto a grided dimensional area; determine a general trajectory between each time sequenced GPS datapoint in the plurality of encoded time sequenced GPS datapoints and a subsequent encoded time sequenced GPS datapoint; cluster the encoded time sequenced GPS datapoints based on a respective determined trajectory with a plurality of encoded historical GPS datapoints; calculate an azimuth for each encoded time sequenced GPS datapoint in the plurality of time sequenced GPS datapoints utilizing a plurality of adjacent historical GPS datapoints contained within a respective cluster; generate a plurality of interpolated GPS datapoints utilizing calculated azimuths, determined general trajectories, and historical GPS datapoints; and aggregate the generated interpolated GPS datapoints with the plurality of time sequenced GPS datapoints into an interpolated route, wherein each GPS datapoint in the interpolated route is within respective azimuth thresholds.

20 Claims, 5 Drawing Sheets

LOW-SAMPLING RATE GPS TRAJECTORY LEARNING

BACKGROUND

The present invention relates generally to data processing, and more particularly field of trajectory data mining.

The Global Positioning System (GPS) is a satellite-based radio navigation system that provides geolocation and time information to a GPS receiver anywhere on or near the Earth where there is an unobstructed line of sight to a plurality of GPS satellites. Obstacles such as mountains and buildings block the relatively weak GPS signals. GPS does not require the user to transmit any data, and it operates independently of any telephonic or internet reception, though these technologies can enhance the usefulness of the GPS positioning information.

SUMMARY

Embodiments of the present invention disclose a computer-implemented method, a computer program product, and a system. The computer-implemented method includes one or more computer processers encoding a plurality of time sequenced global position system (GPS) datapoints onto a grided dimensional area, wherein the plurality of time sequenced GPS datapoints are sampled from a low frequency sampling computing device and correspond to a route. The one or more computer processors determine a general trajectory between each time sequenced GPS datapoint in the plurality of encoded time sequenced GPS datapoints and a subsequent encoded time sequenced GPS datapoint. The one or more computer processors cluster the encoded time sequenced GPS datapoints based on a respective determined trajectory with a plurality of encoded historical GPS datapoints. The one or more computer processors calculate an azimuth for each encoded time sequenced GPS datapoint in the plurality of time sequenced GPS datapoints utilizing a plurality of adjacent historical GPS datapoints contained within a respective cluster. The one or more computer processors generate a plurality of interpolated GPS datapoints utilizing calculated azimuths, determined general trajectories, and historical GPS datapoints. The one or more computer processors aggregate the generated interpolated GPS datapoints with the plurality of time sequenced GPS datapoints into an interpolated route, wherein each GPS datapoint in the interpolated route is within respective azimuth thresholds.

DETAILED DESCRIPTION

In the field of trajectory data mining, road network data, and GPS sampling data are the basic data inputs for algorithm research and application development but due to inaccuracies caused by modern GPS equipment, subsequent GPS data can be sparse and without contextual information (i.e., corresponding road network data). Typically, road network data provides road information allowing further data analysis and the correction of abnormal GPS sampling points. However, due to the prohibitive cost of high-frequency sampling equipment and devices, many enterprises and applications do not have access to reliable and cost-effective GPS sampling data. Furthermore, efficient research in this field requires access to reliable road network data but due to the continuous development of urban regions, road network data is prone to untimeliness and is typically unreliable. Additionally, when enterprises try to build or construct a road or map service system, said system can have difficulty processing recorded historical trajectory data due to missing contextual road network data. At this time, without the help of road network data, high-frequency GPS data cannot be used to explore road network systems and simulate the actual road network dynamics.

Embodiments of the present invention allow for efficient sampling data outlier discovery through adapting low frequency GPS trajectory sparse data points in order to provide reliable GPS sampling data while reducing related enterprise costs, simplifying the complexity of the data and basic research, and improving the efficiency of path prediction. Embodiments of the present invention improve GPS sampling and path prediction through efficient interpolation utilizing calculated trajectories between two GPS datapoints based on sampling datapoints comprising disparate time dimensions. Embodiments of the present invention improve path prediction without the participation or inclusion of road network information (i.e., road structure, road intersections, etc.) utilizing a plurality of calculated azimuths of adjacent historical datapoints for datapoint deviation correction while avoiding the establishment and utilization of a probability model, which in turn reduces system complexity while reducing system requirements and computational costs. Implementation of embodiments of the invention may take a variety of forms, and exemplary implementation details are discussed subsequently with reference to the Figures.

The present invention will now be described in detail with reference to the Figures.

Figure 1:
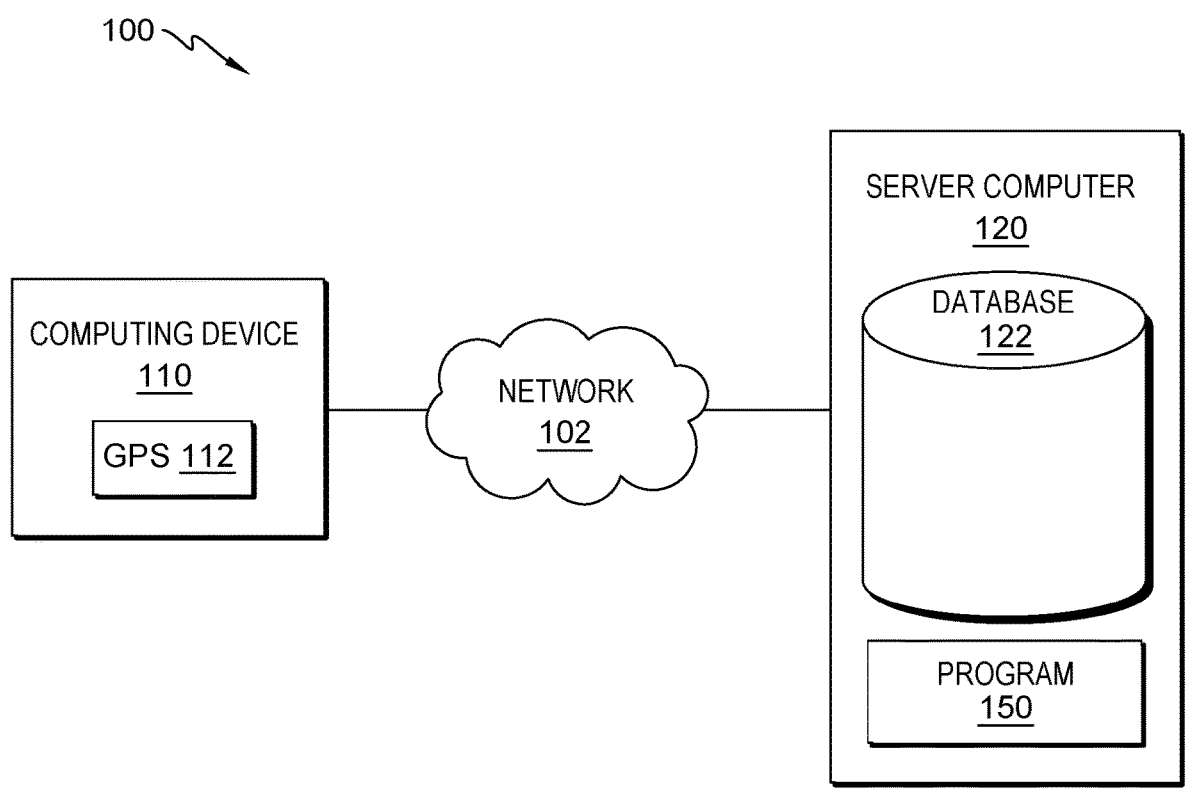
FIG. 1 (i.e., FIG.) is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 and server computer 120, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 110, server computer 120, and other computing devices (not shown) within distributed data processing environment 100. In various embodiments, network 102 operates locally via wired, wireless, or optical connections and can be any combination of connections and protocols (e.g., personal area network (PAN), near field communication (NFC), laser, infrared, ultrasonic, etc.).

Computing device 110 may be any electronic device or computing system capable of processing program instructions and receiving and sending data. In some embodiments, computing device 110 may be a laptop computer, a tablet computer, a netbook computer, a personal computer (PC), a desktop computer, a personal digital assistant (PDA), a smart phone, or any programmable electronic device capable of communicating with network 102. In other embodiments, computing device 110 may represent a server computing system utilizing multiple computers as a server system, such as in a cloud computing environment. In general, computing device 110 is representative of any electronic device or combination of electronic devices capable of executing machine readable program instructions as described in greater detail with regard to FIG. 5, in accordance with embodiments of the present invention. In an embodiment, computing device 110 contains GPS 112. In another embodiment, computing device 110 represents one or more devices associated with a driver (i.e., user) or a vehicle.

In various embodiments, the term transport mechanism, also referred to as "vehicle", should be construed having a broad meaning and should include any means of transportation. Non-limiting examples of transport mechanisms include passenger cars, trucks, motorcycles, off-road/all-terrain vehicles, buses, boats, airplanes, helicopters, recreational vehicles, farm vehicles, construction vehicles, trams, golf carts, trains, and/or trolleys. In various embodiments, the term "drive" should be construed having a board meaning and should include operating all types of transport mechanisms as delineated above.

GPS 112 is a device, receiver, or sensor that is capable of receiving information from global positioning system (GPS) satellites and calculating the device's geographical position. In most embodiments, GPS 112 has a track algorithm that combines sets of satellite measurements collected at different times. After a set of measurements are processed, the track algorithm predicts the receiver location corresponding to the next set of satellite measurements. When the new measurements are collected, the receiver uses a weighting scheme to combine the new measurements with the tracker prediction. In general, a tracker can (a) improve receiver position and time accuracy, (b) reject bad measurements, and (c) estimate receiver speed and direction. GPS 112 also transmits information regarding the user orientation and speed.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with computing device 110 and other computing devices (not shown) within distributed data processing environment 100 via network 102. In another embodiment, server computer 120 represents a computing system utilizing clustered computers and components (e.g., database server computers, application server computers, etc.) that act as a single pool of seamless resources when accessed within distributed data processing environment 100. In the depicted embodiment, server computer 120 includes database 122 and program 150. In other embodiments, server computer 120 may contain other applications, databases, programs, etc. which have not been depicted in distributed data processing environment 100. Server computer 120 may include internal and external hardware components, as depicted and described in further detail with respect to FIG. 5.

Database 122 is a repository for data used by program 150. In the depicted embodiment, database 122 resides on server computer 120. In another embodiment, database 122 may reside on computing device 110 or elsewhere within distributed data processing environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as historical GPS datapoints, historical encoded GPS datapoints with associated trajectories and azimuth values. In another embodiment, database 122 contains targeted or current datapoints corresponding to a specific route that is associated with low frequency sampling. Here, the low-frequency sampling results in a sparse distribution of trajectory data sampling datapoints, significantly reducing the value and information contained in said datapoints. In a further embodiment, the current GPS datapoints are without participation of road network information. In an embodiment, the current and historical GPS datapoints have temporal attributes that can be constructed into time series data. In this embodiment, said GPS datapoints represent a driving direction and a sequence of a single track (e.g., path, route, etc.).

Program 150 is a program for historical trajectory learning. Program 150 solves the sparse problem of single trajectory data with low sampling frequency without road network data, reduces the requirement of enterprise data sampling equipment, and saves computing time and economic cost. In various embodiments, program 150 may implement the following steps: encode a plurality of time sequenced global position system (GPS) datapoints onto a grided dimensional area, wherein the plurality of time sequenced GPS datapoints are sampled from a low frequency sampling computing device and correspond to a route; a general trajectory between each time sequenced GPS datapoint in the plurality of encoded time sequenced GPS datapoints and a subsequent encoded time sequenced GPS datapoint; cluster the encoded time sequenced GPS datapoints based on a respective determined trajectory with a plurality of encoded historical GPS datapoints; calculate an azimuth for each encoded time sequenced GPS datapoint in the plurality of time sequenced GPS datapoints utilizing a plurality of adjacent historical GPS datapoints contained within a respective cluster; generate a plurality of interpolated GPS datapoints utilizing calculated azimuths, determined general trajectories, and historical GPS datapoints; and aggregate the generated interpolated GPS datapoints with the plurality of time sequenced GPS datapoints into an interpolated route, wherein each GPS datapoint in the interpolated route is within respective azimuth thresholds. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on computing device 110 and/or any other computing device (not depicted) within distributed data processing environment 100. Program 150 is depicted and described in further detail with respect to FIG. 2.

The present invention may contain various accessible data sources, such as database 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
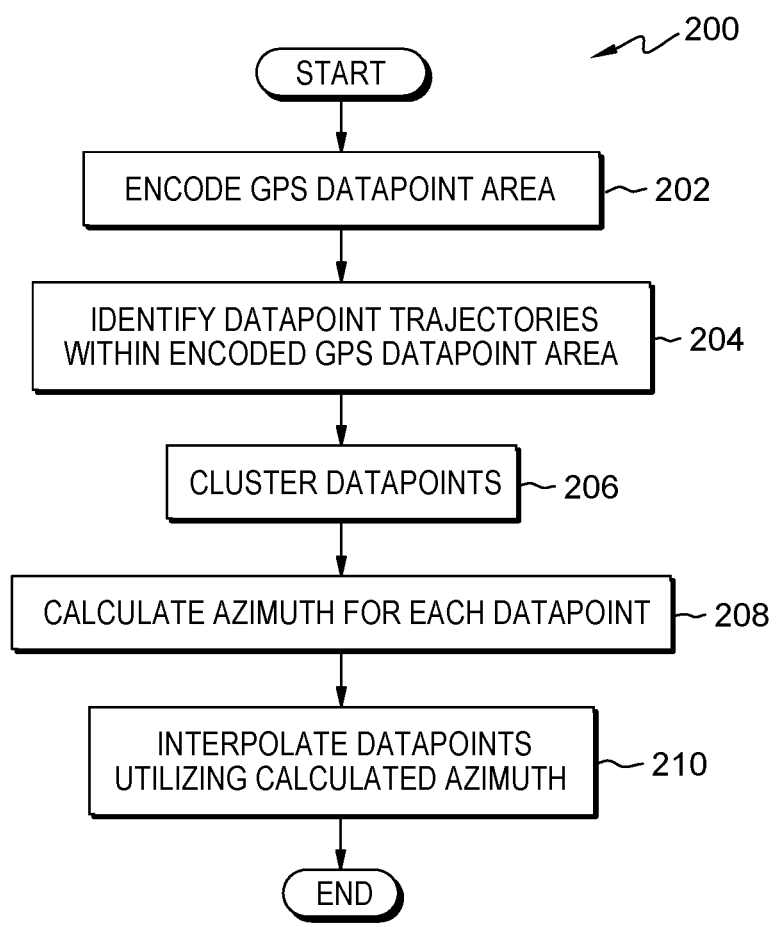
FIG. 2 is a flowchart depicting operational steps of a program, on a server computer within the data processing environment of FIG. 1, for historical trajectory learning, in accordance with an embodiment of the present invention.

FIG. 2 depicts flowchart 200 illustrating operational steps of program 150 for historical trajectory learning, in accordance with an embodiment of the present invention.

Program 150 encodes GPS datapoint area (step 202). In an embodiment, program 150 initiates responsive to a user or computing device 110 streaming GPS data (i.e., time series data). In this embodiment, computing device 110 has a low data sampling frequency (e.g., less than 1 hertz (Hz)) leading to sparse distribution of trajectory sampling datapoints. For example, computing device 110 struggles to provide reliable GPS datapoints (i.e., datapoints) when traveling at higher speeds (e.g., greater than 50 miles per hour (mph)). In another embodiment, program 150 initiates responsive to a received or proposed road network design (i.e., design and layout of the road and road networks to minimize user error). In another embodiment, program 150 initiates responsive to a route or trip (i.e., current route) commenced by a user, computing device 110, or a vehicle associated with the user. In another embodiment, program 150 initiates responsive to a received set of historical GPS routes or trips, where each historical GPS route is comprised of a plurality of GPS datapoints.

Responsive to low sampling frequency datapoints, program 150 encodes a plurality of time sequenced current GPS datapoints (i.e., datapoints associated with a targeted or current route) to a two dimensional area encompassing all the time sequenced GPS datapoints. In this embodiment, the targeted route is comprised of a plurality of sparse GPS datapoints. In an embodiment, program 150 dynamically adjusts the dimensions of the grid based on a plurality of historical GPS datapoints in a proximity to encoded plurality of time sequenced GPS datapoints. For example, program 150 expands the encoded dimensional area to contain all historical GPS datapoints in a specific time frame (e.g., 1 pm-2 pm) within a proximity threshold to a current GPS datapoint (e.g., a focused GPS datapoint from a plurality of GPS datapoints associated with a current or recent trip). Responsive to the encoded dimensional area, program 150 grids the encoded dimensional area into uniform partitions of GPS datapoints, where each GPS datapoint is in a relative proximity to other GPS datapoints in an associated partition. In this embodiment, each partition represents a temporal frame, wherein GPS datapoints in the partition have similar temporal attributes (e.g., temporal position in a temporal sequence of related GPS datapoints).

Program 150 identifies datapoint trajectories within the encoded GPS datapoint area (step 204). Program 150 determines a general trajectory (e.g., vector) between each encoded GPS datapoint in a sequence of encoded GPS datapoints to a respective successive encoded GPS datapoint utilizing the grided area described in step 202. Due to low data sample frequency associated with computing device 110, large portions of a vehicular trip or excursion can be unknown or unreliable, thus this calculated general trajectory provides additional information regarding an associated temporal frame while still lacking road information (i.e., contextual data). In an embodiment, program 150 identifies the general trajectory between each current GPS datapoint and a subsequent current GPS datapoint, establishing a base vector for clustering and azimuth calculations as described in steps 206 and 20813. For example, program 150 calculates that a vehicle is traveling north at an average speed of 33 mph between two encoded GPS datapoints in a temporal frame or period.

Program 150 clusters the datapoints (step 206). Responsive to program 150 calculating one or more GPS datapoint trajectories that encompass the entirety of a sparsely recorded trip or route, program 150 encodes a plurality of historical GPS datapoints and associated historical trips on the grided area, as described in step 202, containing the current GPS datapoints and associated general trajectories. In an embodiment, program 150 creates a plurality of clusters, where each cluster contains temporally related GPS datapoints. In an embodiment, each cluster contains GPS datapoints within a temporal proximity and physical proximity to temporally similar current GPS datapoints in a respective cluster. In an embodiment, program 150 utilizes a classification algorithm (e.g., K-Means Clustering, etc.) to cluster said datapoints, wherein each temporal frame (e.g., 1 minute frames) has a distinct cluster. Here, program 150 determines temporal frames by incorporating the sampling frequency and quality of computing device 110, where a low sampling frequency computing device requires a larger temporal frame to compensate for the datapoint sparsity. Responsive to program 150 creating the plurality of clusters, program 150 calculates a regional center utilizing the encoded and grided datapoints described in step 202, representing a time series clustering center signifying overall trajectory driving direction for each cluster (i.e., each current GPS datapoint).

Figure 3:
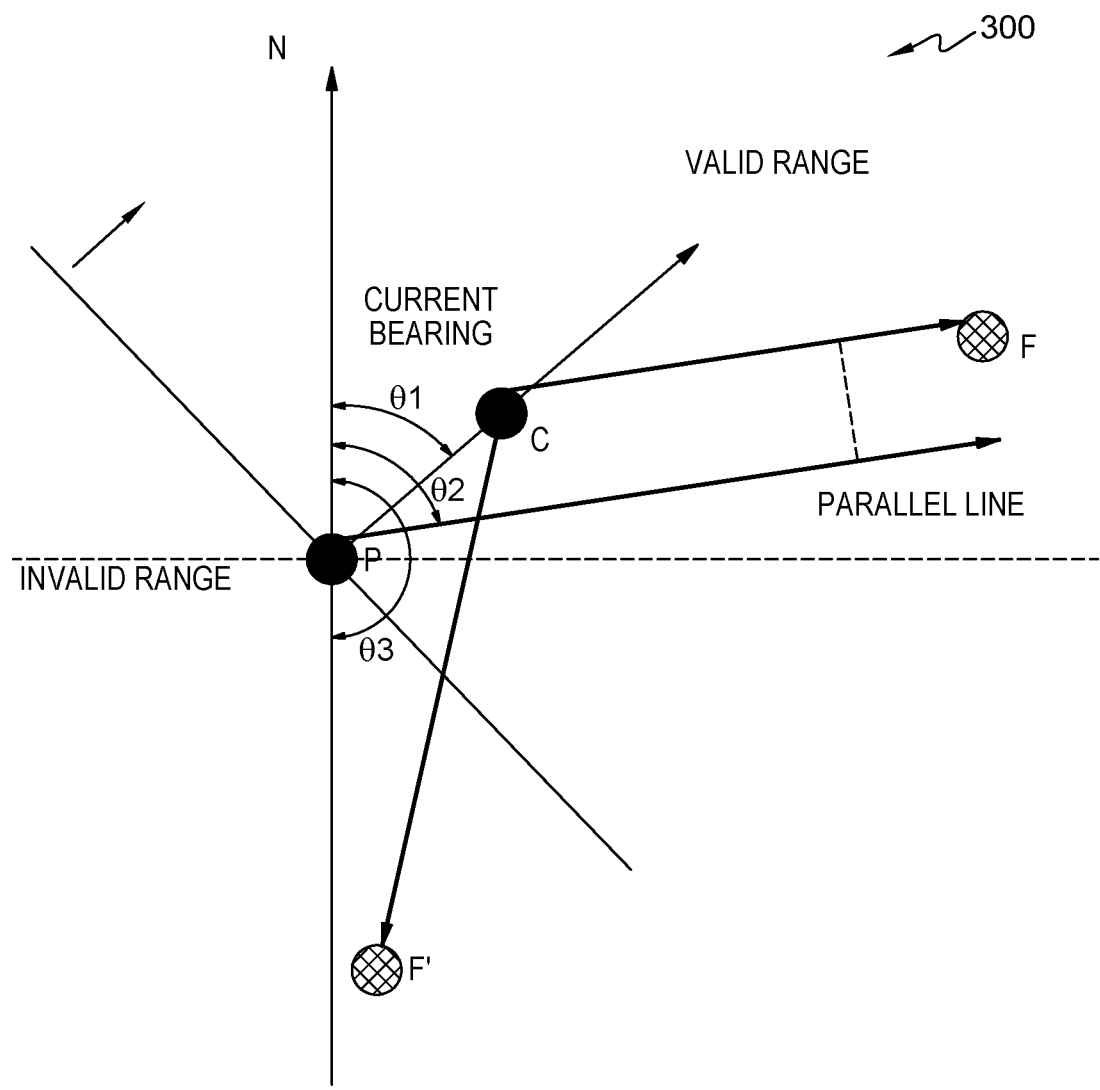
FIG. 3 illustrates an azimuth calculation, in accordance with an embodiment of the present invention.

Program 150 calculates azimuth for clustered GPS datapoints (step 208). Responsive to the clustered GPS datapoints, program 150 calculates an azimuth for each current GPS datapoint in the plurality of GPS datapoints utilizing a plurality of respective adjacent historical GPS datapoints contained within associated cluster. In an embodiment, program 150 utilizes two or more adjacent (e.g., within a distance threshold (e.g., 50 meters)) historical GPS datapoints in a relative time frame to the current GPS datapoint in order to calculate the azimuth (with due north direction) of the user (i.e., driver) at the current position (i.e., current GPS datapoint), as depicted in FIG. 3. In a further embodiment, program 150 utilizes a predefined azimuth threshold or range. For example, program 150 sets the azimuth range to cover between 0 and 180 degrees from the current GPS datapoint and an associated identified general trajectory. In another embodiment, program 150 adjusts the azimuth range based on the respective calculated trajectory of said GPS datapoint.

Responsive to a calculated azimuth for each current GPS datapoint, program 150 removes or ignores all adjacent historical GPS datapoints that exceed the azimuth threshold or range (i.e., abnormal GPS datapoints), where any datapoint outside the azimuth threshold or range would cause the user to travel an unnecessary or unlikely distance (e.g., increase travel distance). In a further embodiment, program 150 considers any adjacent historical GPS datapoint to a probable GPS datapoint (e.g., a current GPS datapoint that corresponds to the driving path of the user or associated computing device (i.e., vehicle)) that exceeds the azimuth range as an abnormal datapoint. In an embodiment, program 150 utilizes the calculated azimuth to formulate a subsequent GPS datapoint probability representing the likelihood that the user or computing device traveled through a specific historical GPS datapoint.

Program 150 interpolates GPS point trajectories (step 210). Responsive to each respective calculated azimuth for each GPS datapoint, program 150 utilizes the azimuth, respective trajectory, and remaining historical GPS datapoints to create interpolated GPS datapoints that cover sections or regions of the current or targeted route that are sparse or unreliable. For example, program 150 utilizes a linear interpolation algorithm to create a plurality of interpolated points between a current GPS datapoint (e.g., the starting GPS datapoint) and an historical GPS datapoint that is within the azimuth range. In an embodiment, program 150 interpolates the trajectories between the remaining datapoints within a current datapoint cluster based on the historical GPS datapoints with different time dimensions. In this embodiment, program 150 utilizes the interpolated trajectories to supplement the current GPS datapoints. In another embodiment, program 150 incorporates contextual road structure data (e.g., specific road paths as opposed to generalized trajectories) associated with the remaining historical GPS datapoints into the interpolated route. In an embodiment, program 150 computes a haversine distance between a current GPS datapoint and two or more potential interpolated or historical GPS datapoints in order to determine which datapoint is suitable for inclusion into the interpolated route. For example, program 150 selects the GPS datapoint with the lowest haversine distance from a targeted or current GPS datapoint. In another embodiment, program 150 computes an aggregated haversine distance comprising all included GPS datapoints in the route (e.g., historical and current GPS datapoints).

In an embodiment, program 150 loops back to step 202 with the interpolated GPS datapoints added to the plurality of current GPS datapoints. In this embodiment, program 150 continues to loop until all historical GPS datapoints have been incorporated into the route or removed from consideration. In another embodiment, program 150 continues to loop until an aggregated subsequent GPS datapoint probability exceeds a predetermined probability threshold. In an embodiment, program 150 aggregates all interpolated GPS datapoints with the current GPS datapoints into a predicted or interpolated route, where each GPS datapoint in the interpolated GPS datapoint is within respective azimuth thresholds or ranges. In an embodiment, program 150 utilizes a completed interpolated route to determine the effectiveness of a corresponding road design proposal. In this embodiment, program 150 initiates road network exploration and urban traffic design analysis utilizing the interpolated route. In another embodiment, program 150 utilizes the completed interpolated route to detect the rationality of road network design, remove the loop and return path of track data, and reduce the travel distance and travel time.

FIG. 3 depicts example 300 illustrating an azimuth calculation, in accordance with an embodiment of the present invention. Example 300 comprising a Cartesian plan of x, y, z coordinates, representing a driving plane, utilized by program 150 to calculate the azimuth angle between a target point (i.e., P) and two adjacent datapoints (i.e., C and F), as described in step 206. Program 150 utilizes the azimuth angle to calculate the instant driving direction of a vehicle represented by the datapoint. Example 300 further demonstrates an azimuth threshold or range that program 150 utilizes to identify abnormal or unreliable datapoints.

Figure 4:
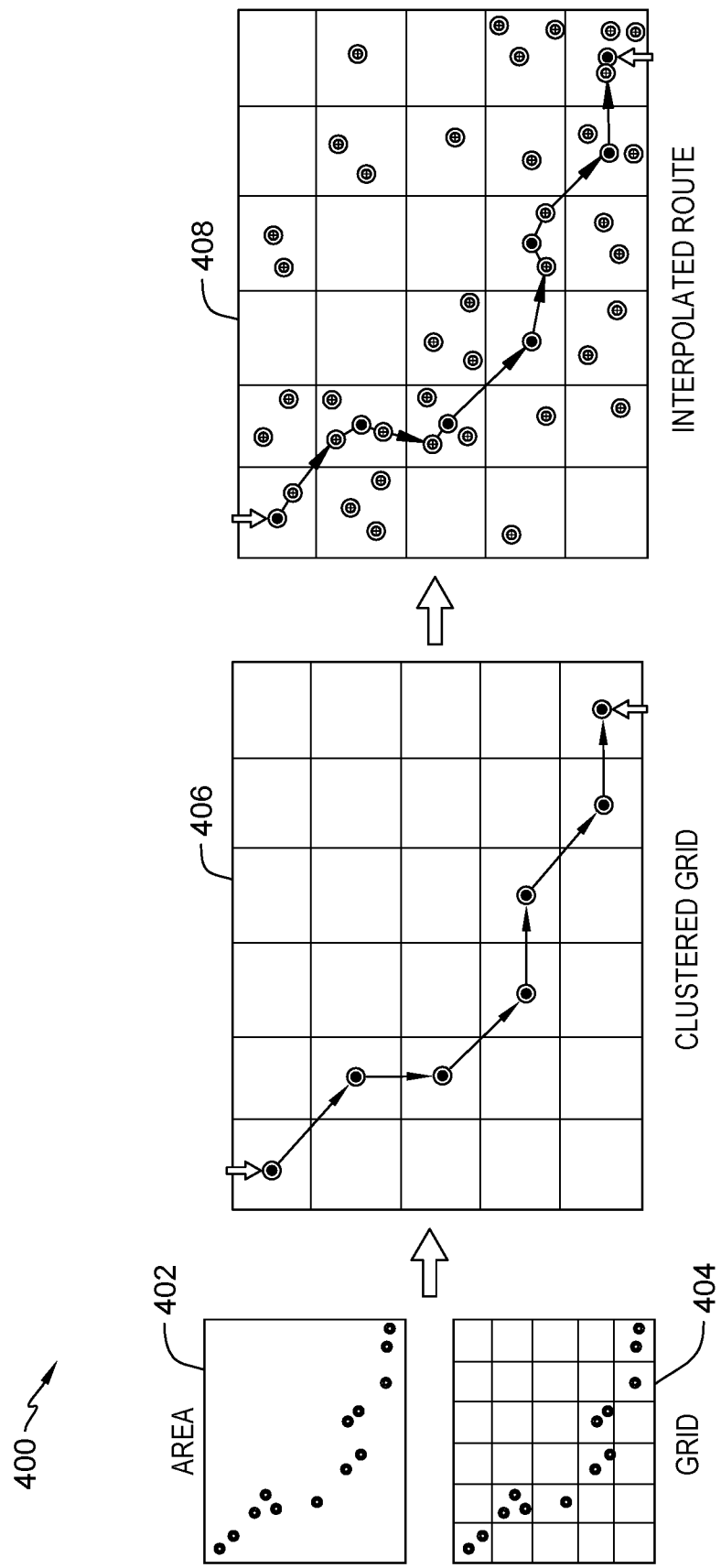
FIG. 4 illustrates operational steps of the program within the data processing environment of FIG. 1, in accordance with an embodiment of the present invention.

FIG. 4 depicts example 400 illustrating operational steps of the program within the data processing environment of FIG. 1, in accordance with an embodiment of the present invention. Example 400 contains area 402 comprising a plurality of encoded time sequenced GPS datapoints, as described in step 202; grid 404 comprising area 402 but partitioned into an uniformed grid, as described in step 202; clustered grid 406 comprising the plurality of encoded time sequenced GPS datapoints with a calculated trajectory vector between each consecutive datapoint, as described in step 204; and interpolated route 408 comprising the plurality of encoded time sequence GPS datapoints interpolated with a plurality of historical GPS datapoints based on respective calculated azimuths, as described in steps 206 and 208.

Figure 5:
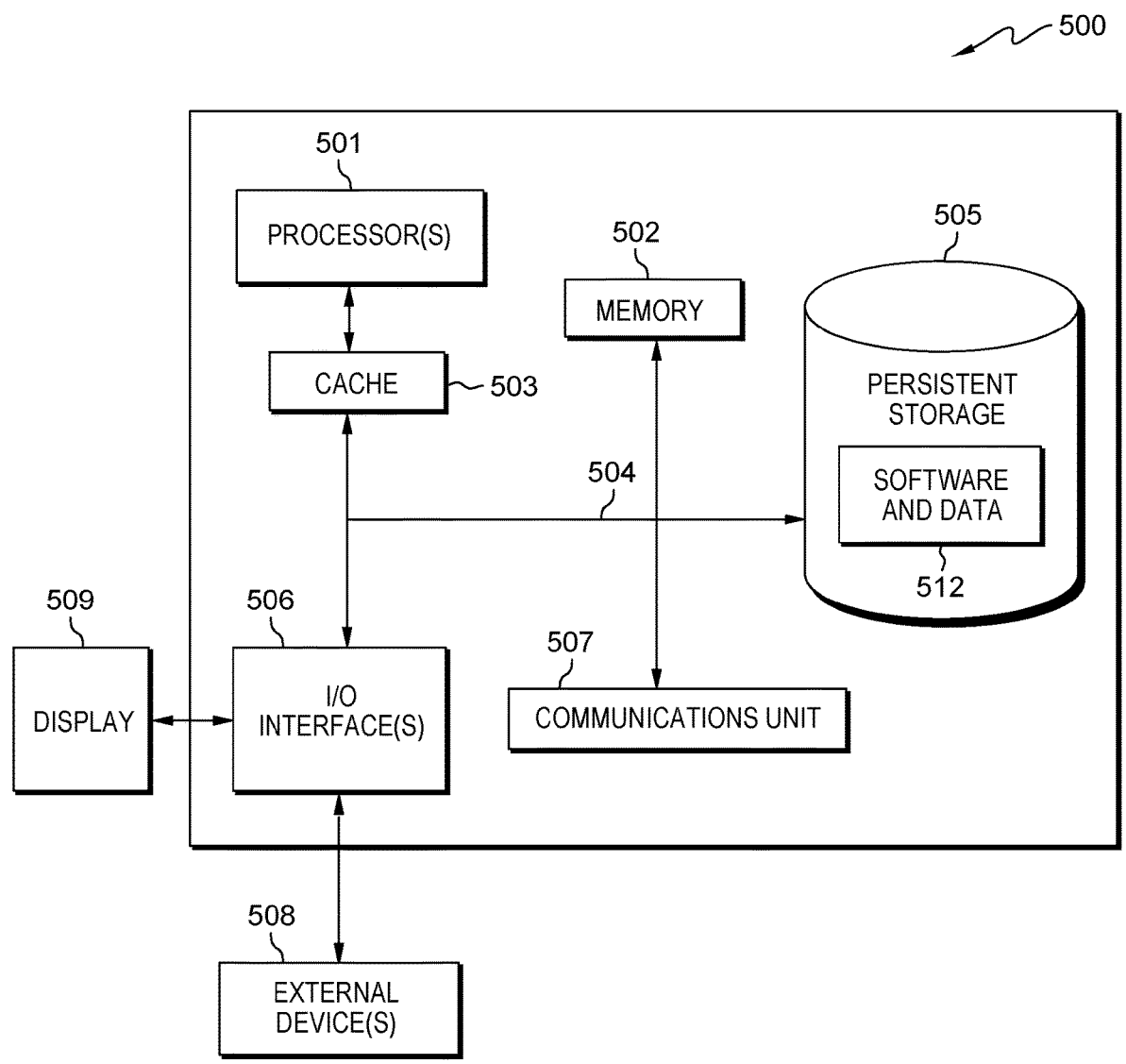
FIG. 5 is a block diagram of components of a computing device and the server computer, in accordance with an embodiment of the present invention.

FIG. 5 depicts block diagram 500 illustrating components of computing device 110 and server computer 120 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 110 and server computer 120 includes communications fabric 504, which provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications, and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of computer processor(s) 501 by holding recently accessed data, and data near accessed data, from memory 502.

Program 150 may be stored in persistent storage 505 and in memory 502 for execution by one or more of the respective computer processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 can be stored in persistent storage 505 for access and/or execution by one or more of the respective processors 501 via cache 503.

Communications unit 507, in these examples, provides for communications with other data processing systems or devices. In these examples, communications unit 507 includes one or more network interface cards. Communications unit 507 may provide communications through the use of either or both physical and wireless communications links. Program 150 may be downloaded to persistent storage 505 through communications unit 507.

I/O interface(s) 506 allows for input and output of data with other devices that may be connected, respectively, to computing device 110 and server computer 120. For example, I/O interface(s) 506 may provide a connection to external device(s) 508, such as a keyboard, a keypad, a touch screen, and/or some other suitable input device. External devices 508 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 505 via I/O interface(s) 506. I/O interface(s) 506 also connect to a display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    encoding, by one or more computer processors, a plurality of time sequenced global position system (GPS) datapoints onto a grided dimensional area, wherein the plurality of time sequenced GPS datapoints are sampled from a low frequency sampling computing device and correspond to a route;
    determining, by one or more computer processors, a general trajectory between each time sequenced GPS datapoint in the plurality of encoded time sequenced GPS datapoints and a subsequent encoded time sequenced GPS datapoint;
    clustering, by one or more computer processors, the encoded time sequenced GPS datapoints based on a respective determined trajectory with a plurality of encoded historical GPS datapoints;
    calculating, by one or more computer processors, an azimuth for each encoded time sequenced GPS datapoint in the plurality of time sequenced GPS datapoints utilizing a plurality of adjacent historical GPS datapoints contained within a respective cluster;
    generating, by one or more computer processors, a plurality of interpolated GPS datapoints utilizing calculated azimuths, determined general trajectories, and historical GPS datapoints; and
    aggregating, by one or more computer processors, the generated interpolated GPS datapoints with the plurality of time sequenced GPS datapoints into an interpolated route, wherein each GPS datapoint in the interpolated route is within respective azimuth thresholds.

2. The computer-implemented method of claim 1, wherein generating the plurality of interpolated GPS datapoints utilizing the respective azimuth, determined general trajectory, and historical GPS datapoints, comprises:
    removing, by one or more computer processors, all historical GPS datapoints resulting in a respective calculated azimuth exceeding an azimuth threshold, wherein the removed historical GPS datapoints increase a travel distance.

3. The computer-implemented method of claim 1, wherein aggregating the generated interpolated GPS datapoints with the plurality of time sequenced GPS datapoints into the interpolated route, wherein each GPS datapoint in the interpolated route is within respective azimuth thresholds, comprises:
    computing, by one or more computer processors, a haversine distance between a current GPS datapoint and two or more historical GPS datapoints; and
    determining, by one or more computer processors, the historical GPS datapoint for inclusion into the interpolated route.

4. The computer-implemented method of claim 1, further comprising:
    calculating, by one or more computer processors, a GPS datapoint probability representing a likelihood that the computing device traveled through a historical GPS datapoint or generated interpolated GPS datapoint.

5. The computer-implemented method of claim 1, wherein clustering the encoded time sequenced GPS datapoints based on a respective determined trajectory with the plurality of encoded historical GPS datapoints, comprises:
    calculating, by one or more computer processors, a regional center of each cluster, wherein the regional center of each cluster represents the general trajectory for each datapoint in the cluster.

6. The computer-implemented method of claim 1, further comprising:
determining, by one or more computer processors, an effectiveness of a road design utilizing the interpolated route.

7. The computer-implemented method of claim 1, further comprising:
dynamically adjusting, by one or more computer processors, one or more dimensions of the grided dimensional area based on a plurality of historical GPS datapoints in a proximity to the plurality of time sequenced GPS datapoints.

8. A computer program product comprising:
one or more computer readable storage media and program instructions stored on the one or more computer readable storage media, wherein the one or more computer readable storage media are not transitory signals per se, the stored program instructions comprising:
program instructions, executable by a processor, to cause the processor to encode a plurality of time sequenced global position system (GPS) datapoints onto a grided dimensional area, wherein the plurality of time sequenced GPS datapoints are sampled from a low frequency sampling computing device and correspond to a route;
program instructions, executable by the processor, to cause the processor to determine a general trajectory between each time sequenced GPS datapoint in the plurality of encoded time sequenced GPS datapoints and a subsequent encoded time sequenced GPS datapoint;
program instructions, executable by the processor, to cause the processor to cluster the encoded time sequenced GPS datapoints based on a respective determined trajectory with a plurality of encoded historical GPS datapoints;
program instructions, executable by the processor, to cause the processor to calculate an azimuth for each encoded time sequenced GPS datapoint in the plurality of time sequenced GPS datapoints utilizing a plurality of adjacent historical GPS datapoints contained within a respective cluster;
program instructions, executable by the processor, to cause the processor to generate a plurality of interpolated GPS datapoints utilizing calculated azimuths, determined general trajectories, and historical GPS datapoints; and
program instructions, executable by the processor, to cause the processor to aggregate the generated interpolated GPS datapoints with the plurality of time sequenced GPS datapoints into an interpolated route, wherein each GPS datapoint in the interpolated route is within respective azimuth thresholds.

9. The computer program product of claim 8, wherein the program instructions, executable by the processor, to cause the processor to generate the plurality of interpolated GPS datapoints utilizing the respective azimuth, determined general trajectory, and historical GPS datapoints, comprise:
program instructions, executable by the processor, to cause the processor to remove all historical GPS datapoints resulting in a respective calculated azimuth exceeding an azimuth threshold, wherein the removed historical GPS datapoints increase a travel distance.

10. The computer program product of claim 8, wherein the program instructions, executable by the processor, to cause the processor to aggregate the generated interpolated GPS datapoints with the plurality of time sequenced GPS datapoints into the interpolated route, wherein each GPS datapoint in the interpolated route is within respective azimuth thresholds, comprise:
program instructions, executable by the processor, to cause the processor to compute a haversine distance between a current GPS datapoint and two or more historical GPS datapoints; and
program instructions, executable by the processor, to cause the processor to determine the historical GPS datapoint for inclusion into the interpolated route.

11. The computer program product of claim 8, wherein the program instructions, stored on the one or more computer readable storage media, further comprise:
program instructions, executable by the processor, to cause the processor to calculate a GPS datapoint probability representing a likelihood that the computing device traveled through a historical GPS datapoint or generated interpolated GPS datapoint.

12. The computer program product of claim 8, wherein the program instructions, executable by the processor, to cause the processor to cluster the encoded time sequenced GPS datapoints based on a respective determined trajectory with the plurality of encoded historical GPS datapoints, comprise:
program instructions, executable by the processor, to cause the processor to calculate a regional center of each cluster, wherein the regional center of each cluster represents the general trajectory for each datapoint in the cluster.

13. The computer program product of claim 8, wherein the program instructions, stored on the one or more computer readable storage media, further comprise:
program instructions, executable by the processor, to cause the processor to determine an effectiveness of a road design utilizing the interpolated route.

14. The computer program product of claim 8, wherein the program instructions, stored on the one or more computer readable storage media, further comprise:
program instructions, executable by the processor, to cause the processor to dynamically adjust one or more dimensions of the grided dimensional area based on a plurality of historical GPS datapoints in a proximity to the plurality of time sequenced GPS datapoints.

15. A computer system comprising:
one or more computer processors;
one or more computer readable storage media; and
program instructions stored on the computer readable storage media for execution by at least one of the one or more processors, the stored program instructions comprising:
program instructions to encode a plurality of time sequenced global position system (GPS) datapoints onto a grided dimensional area, wherein the plurality of time sequenced GPS datapoints are sampled from a low frequency sampling computing device and correspond to a route;
program instructions to determine a general trajectory between each time sequenced GPS datapoint in the plurality of encoded time sequenced GPS datapoints and a subsequent encoded time sequenced GPS datapoint;
program instructions to cluster the encoded time sequenced GPS datapoints based on a respective determined trajectory with a plurality of encoded historical GPS datapoints;
program instructions to calculate an azimuth for each encoded time sequenced GPS datapoint in the plurality of time sequenced GPS datapoints utilizing a plurality of adjacent historical GPS datapoints contained within a respective cluster;

program instructions to generate a plurality of interpolated GPS datapoints utilizing calculated azimuths, determined general trajectories, and historical GPS datapoints; and program instructions to aggregate the generated interpolated GPS datapoints with the plurality of time sequenced GPS datapoints into an interpolated route, wherein each GPS datapoint in the interpolated route is within respective azimuth thresholds.

16. The computer system of claim 15, wherein the program instructions to generate the plurality of interpolated GPS datapoints utilizing the respective azimuth, determined general trajectory, and historical GPS datapoints, comprise:

program instructions to remove all historical GPS datapoints resulting in a respective calculated azimuth exceeding an azimuth threshold, wherein the removed historical GPS datapoints increase a travel distance.

17. The computer system of claim 15, wherein the program instructions to aggregate the generated interpolated GPS datapoints with the plurality of time sequenced GPS datapoints into the interpolated route, wherein each GPS datapoint in the interpolated route is within respective azimuth thresholds, comprise:

program instructions to compute a haversine distance between a current GPS datapoint and two or more historical GPS datapoints; and program instructions to determine the historical GPS datapoint for inclusion into the interpolated route.

18. The computer system of claim 15, wherein the program instructions, stored on the one or more computer readable storage media, further comprise:

program instructions to calculate a GPS datapoint probability representing a likelihood that the computing device traveled through a historical GPS datapoint or generated interpolated GPS datapoint.

19. The computer system of claim 15, wherein the program instructions to cluster the encoded time sequenced GPS datapoints based on a respective determined trajectory with the plurality of encoded historical GPS datapoints, comprise:

program instructions to calculate a regional center of each cluster, wherein the regional center of each cluster represents the general trajectory for each datapoint in the cluster.

20. The computer system of claim 15, wherein the program instructions, stored on the one or more computer readable storage media, further comprise:

program instructions to determine an effectiveness of a road design utilizing the interpolated route.

* * * * *